United States Patent Office 2,974,969
Patented Mar. 14, 1961

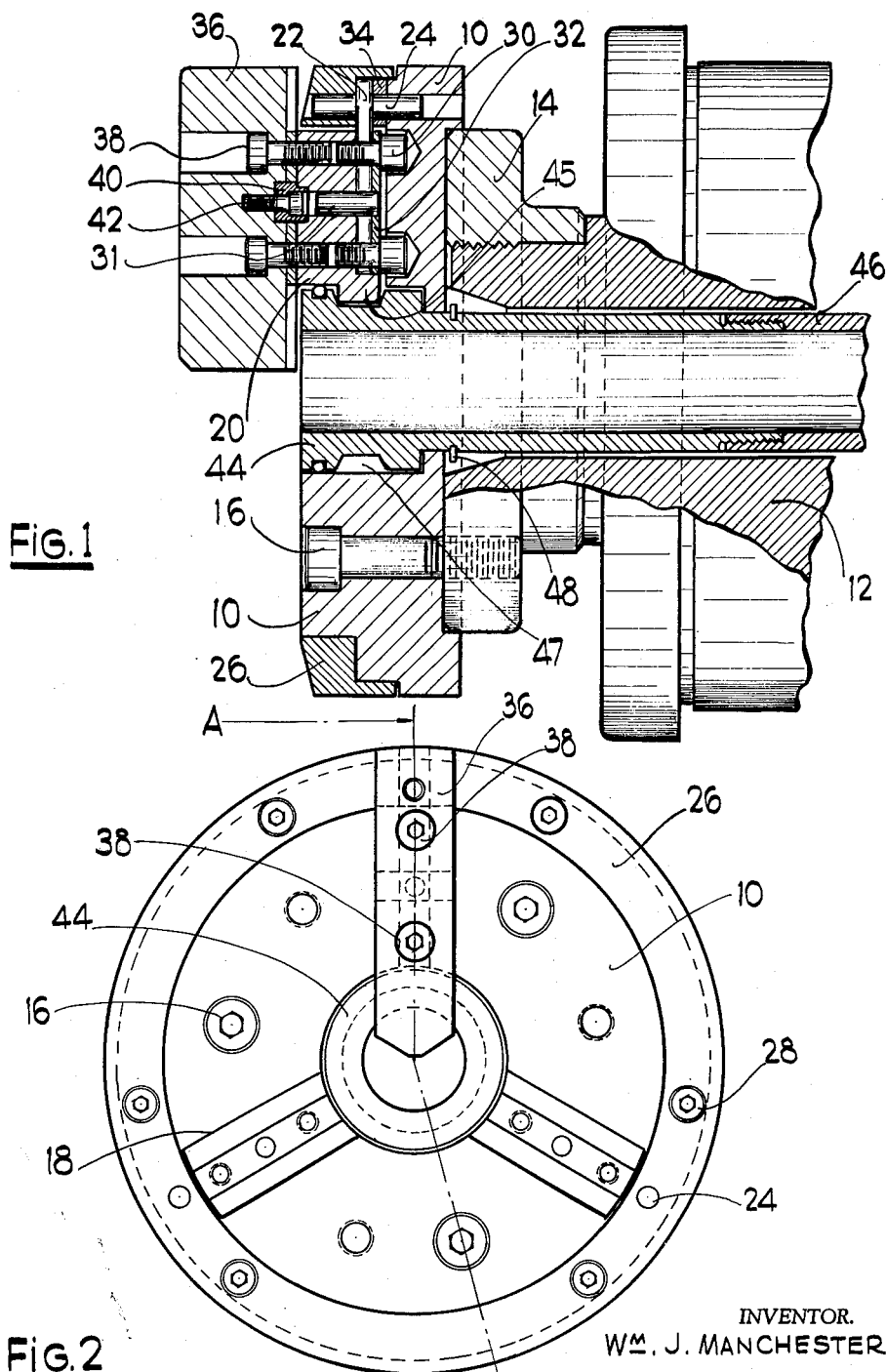

2,974,969
PRECISION POWER CHUCK

William J. Manchester, Rockfall, Conn., assignor to Power Grip, Incorporated, Rockfall, Conn., a corporation of Connecticut Filed Jan. 18, 1960, Ser. No. 3,046

5 Claims. (Cl. 279—123)

This invention relates to work clamping chucks and more particularly to a precision chuck of the power actuated type for application to machine tools such as lathes, grinders, etc.

An object of importance of the present invention is to provide a work clamping chuck actuated to clamp and release a work piece by axial movement of a member mounted co-axially with the chuck, this axially movable member engaging the inner ends of spring mounted master jaws.

A feature of importance of the invention enabling the jaws to maintain their radial positions is that each jaw is mounted on a radially extending flat resilient member, the outer end of each resilient member being secured to the chuck body adjacent the periphery of the chuck body and the inner portions of each resilient member being attached to to the back face of a master jaw.

Another object of the invention is to provide clamping action for the jaws while they are supported rigidly against radial movement, the only movement of the jaws being a slight swinging movement by flexing of the resilient members between fixed limiting positions.

Another feature of the invention that is advantageous is that the overhang of the chuck is reduced to a minimum due to the mounting of the jaws, that is, the resilient members on which the jaws are mounted are of flat strips of metal such as steel and have relatively little thickness.

Also it is an object of the invention to provide the axially movable actuator in the form of a tube passing through the spindle on which the chuck is mounted to enable operations to be carried out on long work pieces such as rods or bars extending through the axial openings of the tube and to permit a coolant to be admitted to the chuck from the rear end of the spindle on which the chuck is mounted.

Another feature that is advantageous is that the power means acting on the draw tube may be widely varied so that the pressure acting on the jaws to clamp a work piece may be accurately regulated.

And finally a feature of importance is that the tubular actuator is adapted for operating collets by simply interchanging the chuck for a standard length collet.

With the above and other objects in view, the invention may include the features of construction and operation set forth in the following specification and illustrated in the accompanying drawing.

In the accompanying drawing annexed hereto and forming a part of this specification, the invention is shown mounted for operation at one end of a rotatable horizontal spindle, but it will be understood that the invention may be otherwise embodied and that the drawing is not to be construed as defining or limiting the scope of the invention, the claims appended to this specification being relied upon for that purpose.

In the drawing:

Fig. 1 is a longitudinal central sectional view of a chuck made in accordance with the present invention; and Fig. 2 is a front elevation of the chuck shown in Fig. 1, parts being removed to more clearly show the construction.

In the above mentioned drawing there has been shown but one embodiment of the invention which is now deemed preferable, but it is to be understood that changes and modifications may be made within the scope of the appended claims without departing from the spirit of the invention.

Referring more in detail to the figures of the drawing and first to Fig. 1, it will be seen that the body member 10 of the chuck is co-axially mounted on an end of a rotatably mounted spindle 12 by means of an adaptor plate 14 threaded over the end of the spindle. As the adaptor plate 14 and its connection to the spindle 12 form no part of the present invention, further description is thought to be unnecessary. Any means such as the screws 16 shown in the drawing may be used to secure the chuck body 10 to the adaptor plate 14 in fixed position co-axial with the spindle 12.

Milled into the front surface of the chuck body 10 are three radial slots or recesses 18 disposed at 120° to each other. Within these slots or recesses 18 are positioned the master jaws 20. Each master jaw 20 is mounted on the front surface of a radially extending resilient metal bar 22 housed within a slot or recess 18 and maintained in its radial position by a stud 24 passing through the outer end of the bar 22 and at its inner end entering the chuck body 10 adjacent its periphery. The outer end of this stud 24 enters an opening in the front ring 26 of the chuck centrally mounted on the chuck body 10 in a bevelled recess at the periphery thereof and attached thereto by any conventional means such as screws 28. Each stud 24 is tightly fitted to its openings through the bar 22, the chuck body and front ring 26.

As shown in Fig. 1, the master jaws 20 are attached to the front surface of resilient bars or members 22, there being two screws 30 provided for each jaw. Between the heads of the screws 30 and rear surface of a bar 22 is a backing strip 32, and to accommodate the screw heads the chuck body 10 is recessed as shown. Also a stud 31 may be provided for each jaw 20 passing through the bar or member 22, the master jaw 20 and the backing strip 32.

At its outer end each bar 22 is clamped between a spacer block 34 housed within the jaw recess 18 and the front ring 26 of the chuck. The intermediate portions of the bars 22 are reduced in thickness to give the desired resilience thereto. Between the back face of a bar 22 and the chuck body 10 the spacer block 34 is clamped in position by the front ring 26 being clamped in position.

On the outer face of the master jaws 20 are positioned the work clamping jaws 36 secured to the master jaws respectively by screws 38 preferably and as shown entering the threaded holes for screws 30. To lock the working jaws 36 to their master jaws 20 respectively a transversely extending key 40 is housed within opposed recesses in the adjacent faces of the master and working jaws. As shown this key 40 is of different widths throughout its length, adapted for fitting slots of different width respectively in the master jaws 20 and working jaws 36. One side surface of the key 40 is plane while the opposite side surface has two parallel plane surfaces closely adjacent each other. By inverting the key 40 the radial adjustment of a working jaw 36 may be varied relative to its master jaw 20. A screw 42 passing through the key 40 serves to secure the key to its working jaw 36.

From the above description it will be seen that the jaws 20 and 36 may swing slightly by flexure of their supporting bars 22. This swinging movement is, however, without any radial movement due to the studs 24 and 31 being closely fitted. To effect this movement the inner ends of the master jaws 20 have projections 45 entering an annular groove 47 provided in the head 44 connected to the operating or draw tube 46 extending centrally and moving axially of the chuck. As shown in Fig. 1 of the drawing, the draw head 44 is attached to the draw tube 46 by interengaging screw threads and the length of the draw tube end of the head 44 is made suitable for operation with a standard collet without requiring substitution of a different draw tube. Movement of this tube 46 is controlled by pneumatic or other power means of any standard type mounted at the opposite end of the spindle on which the chuck is mounted. To limit movements axially of the tube 46 to effect slight swinging movement of the jaws 20 and 36, a ring 48 may be housed within an annular groove provided in the draw head 44. The ring 48 as shown is closely adjacent the rear face of the chuck body 10. To limit movement of the tube 46 in the opposite direction, the draw head 44, in its limiting position to the right, may abut against a surface of the chuck body 10.

As shown in the figures of the drawing the movement of the draw tube 46 is extremely limited and is only sufficient to effect swinging movement of the jaws to clamp articles of closely identical diameter for any single adjustment of the working jaws 36 on their master jaws 20. Fig. 1 shows the tube 46 in its mid position. Also, the draw head 44 may be attached to the draw tube by being threaded thereto as shown and may be of sufficient length so that with the chuck 10 removed, the draw tube 46 may have a standard collet chuck substituted for the chuck without requiring a different draw tube.

I claim as my invention:

1. A work clamping chuck comprising a chuck body, radially disposed master jaws thereon, resilient bars attached at their outer ends to said chuck body and at their intermediate ends to said master jaws respectively, means on said chuck body to laterally support and guide said jaws, and unitary means to actuate the inner ends of said jaws axially of said chuck between predetermined limits.

2. A work clamping chuck comprising a chuck body having radially extending recesses therein, master jaws housed therein, resilient bars with said recesses secured at their outer ends to said chuck body and at their intermediate portions to said master jaws, and means engaging the inner ends of said master jaws and movable axially of the chuck to flex said bars and actuate said jaws.

3. A work clamping chuck comprising a chuck body having radially extending recesses therein, master jaws housed therein, resilient bars extending longitudinally within said recesses, said jaws being attached to the inner ends of said bars, said bars at their outer ends being clamped to said chuck body, and studs passing through openings in said bars and chuck body to retain said master jaws in fixed radial positions.

4. A work clamping chuck comprising a chuck body having radially extending recesses therein, master jaws housed therein, working jaws attached to said master jaws and moving therewith, resilient bars extending longitudinally within said recesses, said jaws being attached to the inner ends of said bars, said bars at their outer ends being clamped to said chuck body, and studs passing through openings in said bars and chuck body to retain said master jaws in fixed radial positions.

5. A work clamping chuck comprising a chuck body, radially disposed recesses in its front face, master jaws housed within said recesses, resilient members attached to the inner faces of said jaws, a front clamping ring for said chuck, said ring securing the outer ends of said resilient members in fixed radial position of said body member, and studs passing through said resilient members respectively to retain said resilient members against radial movement relative to said chuck, and for retaining said master jaws against radial movement relative to said resilient members.

References Cited in the file of this patent

UNITED STATES PATENTS

| | | |
|---|---|---|
| 2,492,640 | Hohwart | Dec. 27, 1949 |
| 2,719,721 | Grobey | Oct. 4, 1955 |
| 2,832,601 | Mann | Apr. 29, 1958 |